April 22, 1941.  J. B. MURGATROYD ET AL  2,239,619
APPARATUS FOR STENCILING
Filed June 25, 1938   6 Sheets-Sheet 3
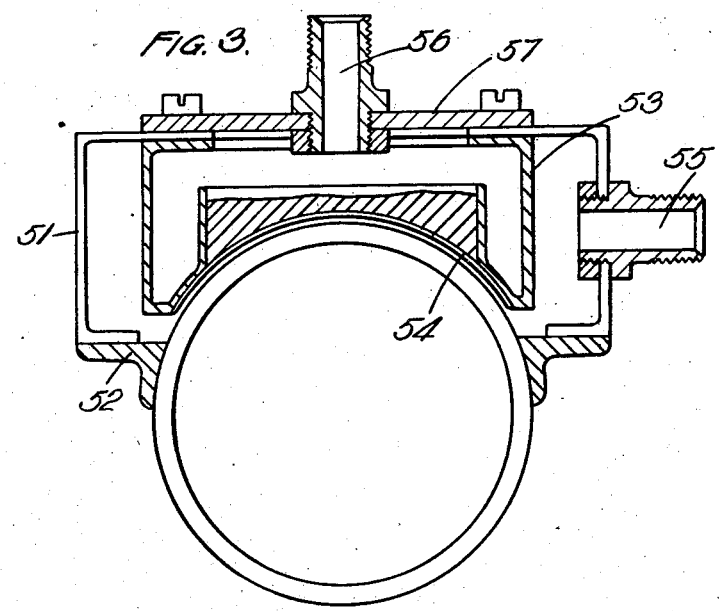
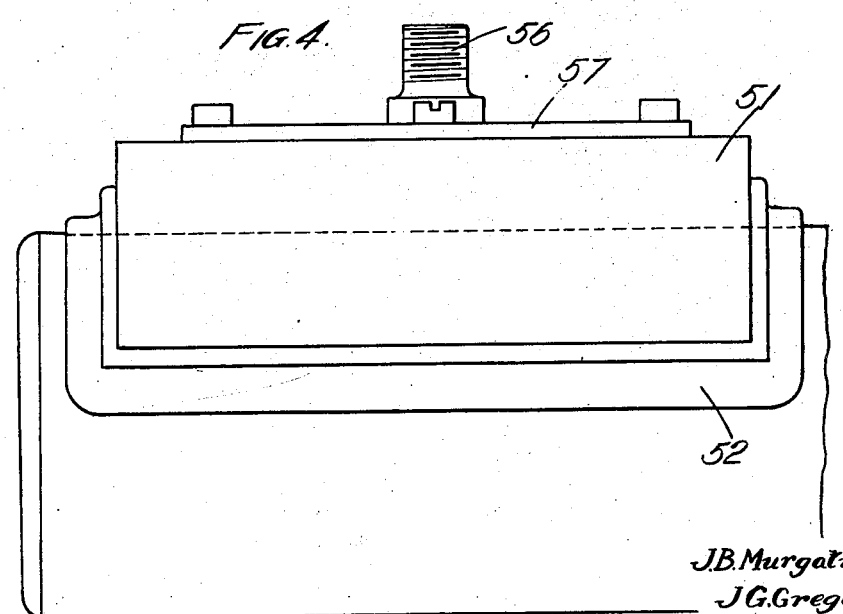
J.B. Murgatroyd
J.G. Gregory
INVENTORS.
Rule + Hoge
ATTORNEYS J. B. Murgatroyd
J. G. Gregory
INVENTORS.

Rule & Hoge
ATTORNEYS

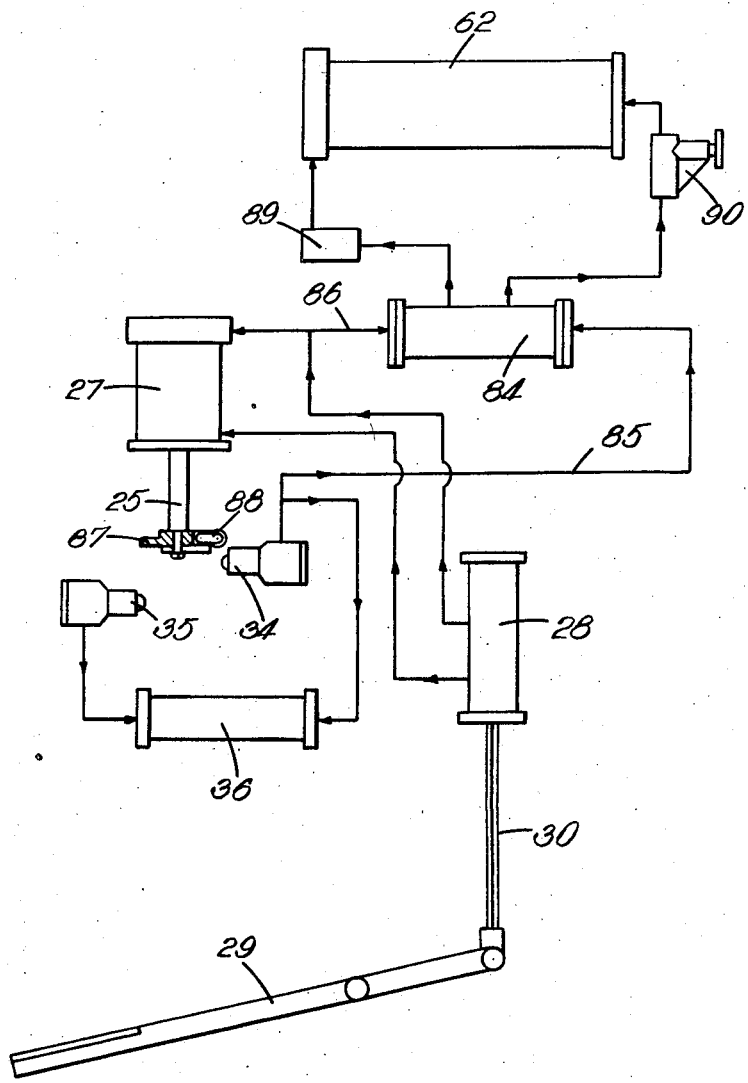

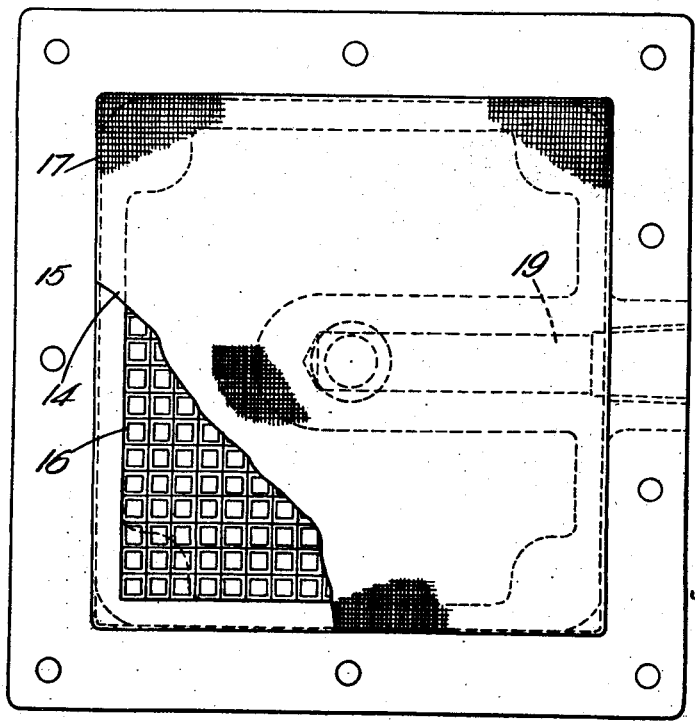

Patented Apr. 22, 1941

2,239,619

UNITED STATES PATENT OFFICE 2,239,619

APPARATUS FOR STENCILING

John Blackburn Murgatroyd and John Goodland Gregory, Greenford, England, assignors to Owens-Illinois Glass Company, a corporation of Ohio Application June 25, 1938, Serial No. 215,818
In Great Britain July 2, 1937

9 Claims. (Cl. 101—115)

This invention relates to the application of colours or the like to various surfaces and has particular but not exclusive reference to the production of decorative or coloured effects on the surfaces of glass bottles. At present ceramic colours, for example, are applied to the surfaces of glass bottles by several methods, as for instance the use of a transfer paper to which the colour is applied and from which it is subsequently transferred on to the surface of the glass bottle, the latter being subsequently heated to fuse the colour. Another method involving the use of a fine mesh screen or stencil is to apply the colour through the screen or stencil by means of a squeegee which forces the colour through the stencil on to the surface to be decorated. This squeegee makes a line contact across the stencil and in the case of bottle decoration the squeegee remains stationary while the screen is drawn under the squeegee in contact with a rotating bottle. In the case of decorating a flat surface the screen is laid on the surface and the squeegee is wiped across the surface of the screen, thereby forcing colour through the stencil in a line across the screen as the squeegee moves over it.

The chief object of the present invention is to enable the colour or colours to be readily applied either to a transfer paper or directly to the surface of the article to be decorated by an improved method which in either case is especially suitable for mechanical control or operation to ensure a large and rapid output.

According to one feature of the invention, a stencil or screen is used, and the colour is caused to pass through the stencil on to the surface (which may be the surface of a transfer paper or the surface of a bottle or any other surface) by means of a differential fluid pressure between the two surfaces of the stencil which acts over the whole area of the stencil or the pattern thereof so that the complete colour design or pattern is wholly applied or deposited on the surface as it contacts with the stencil. The differential pressure action may be produced by a pressure acting on the colours on the one surface of the stencil, or by a suction effect applied to the other surface of the stencil, or by a combination of the suction on the one surface of the stencil and pressure on the other. Usually the suction effect is employed in the case of applying the colour to a transfer paper, the suction acting through the paper for the purpose of drawing the color through the stencil on to the paper. The suction effect through the transfer is an important feature as it assists in removing or stripping the paper from the stencil with the proper application of the colour thereon. Pressure could be applied on the colour on the stencil in addition to or instead of the suction effect, but in the latter case, the suction effect for the purpose of removing or stripping the paper from the stencil would be desirable. Pressure acting on the colours is usually employed when the colour is to be applied to a surface (such as a glass bottle surface) through which the suction cannot be applied to the stencil, although it is feasible in cases of this kind to arrange for a small space to be left between the stencil and the said surface, which space is evacuated by a suction effect in order to cause the stencil to be drawn into contact with the bottle surface, and at the same time to draw the colour through the stencil so that it is deposited on the surface of the bottle. This suction effect may be used alone or with pressure acting on the colour above the stencil.

A further feature of the invention, is an arrangement whereby a number of different or separate colours can be simultaneously applied to the requisite surface. For this purpose a multi-colour font or compartment may be provided on one side of the stencil to receive the different or separate colours. In both the case of a single colour font and a multi-colour font, the bottom or a wall of the font is constituted by the screen or stencil which is shaped to suit the surface of the article to which the colour or colours are to be applied. In the case of a transfer paper the stencil is usually flat, but when applying the colour direct to the article to be decorated, where the surface may be curved, as in the case of a cylindrical bottle, the stencil is of curved or arcuate form. A successive application of different colors can also be made for producing a multi-colour effect, and this would apply particularly in the case of transfer papers where provision would be made for proper registering of the different impressions and preventing the colour of one impression from being smudged or affected by the next colour application.

In accordance with yet another feature of the invention, the arrangement may be such that the screen or stencil may be so mounted that it can be tilted or hingedly moved when effecting the separation or removal of the transfer paper from the screen. Further, means may be provided adapted to act on the stencil or screen itself or on a flexible marginal support carrying the screen, so that during the removal or separating operation, relative movement between the said means and the screen takes place, for example by said means travelling over the screen or screen support in such a way as to strip or assist in stripping the screen from the transfer paper. This latter feature is more particularly intended for use in the case where the screen or its supporting frame is tilted during the removal or stripping operation. The screen or stencil is generally secured at its edges to a flexible marginal support of rubber or other material which is held in a frame, while the said means preferably bear on the flexible support, but this is not essential as they may bear on the screen which may or may not be mounted on a flexible support. The said means may comprise, for example, rollers that bear on the screen and which may travel over and in contact with the screen so that owing to the flexibility of the screen, the rollers bearing on the screen effect a line of pressure which assists in the removal or stripping of the screen from the transfer paper.

It is not essential that the stencil or screen should be mounted for tilting or pivotal movement since if desired the arrangement may be such that the transfer paper support may be hinged at one end or side so as to be capable of being moved towards and away from the stencil or screen which latter may normally be retained stationary.

In order that the said invention may be clearly understood and readily carried into effect the same will now be more fully described with reference to the accompanying drawings, in which—

Figure 3 shows in cross section a stencil box suitable for use in direct printing on curved surfaces such as the surface of a bottle.

Figure 4 is a side elevation of the stencil box shown in Figure 3.

Figure 8 is a diagrammatic view illustrating the lay-out of part of the motive fluid circuit.

Figure 9 shows a stencil mounted on a frame and is on a larger scale than that shown in Figure 1.

Figure 10 shows in section and on a larger scale the transfer paper support or table illustrated in Figure 1, the view being taken at right angles to that shown in Figure 1.

Figure 10a shows a detail of construction on a larger scale.

Figure 11 is a plan view of the support or table shown in Figure 1, certain portions being broken away.

Figure 1:
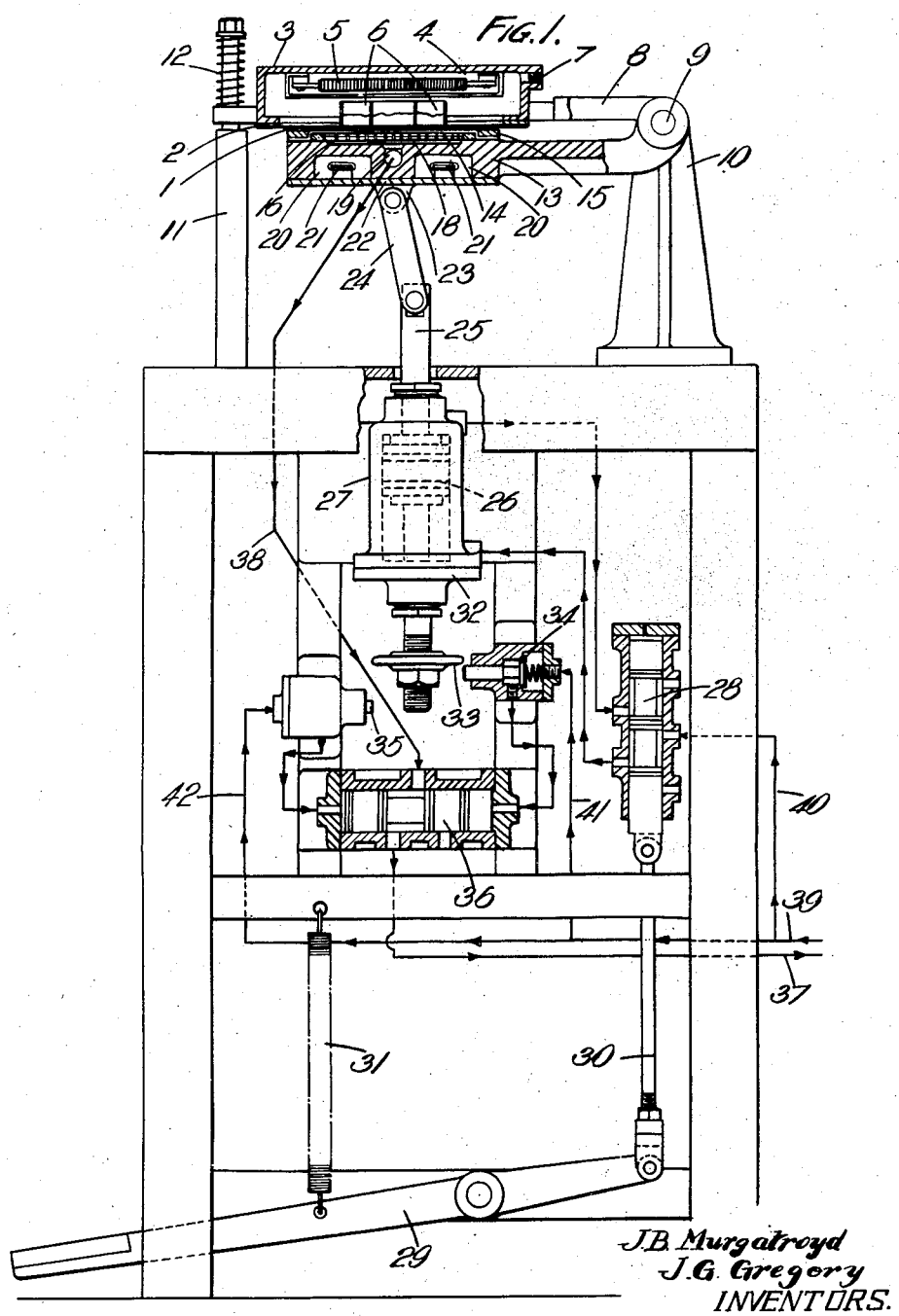
Figure 1 is a side elevation partly in section of an apparatus for producing transfers.

Referring to the drawings, wherein like numerals denote the same parts in all figures, 1 denotes a screen or stencil which is mounted on a frame 2 in turn secured to the underside of a stencil box 3. Disposed within a compartment 4 at the upper part of the box 3 (Figure 1) is a resistance heating element 5 which is totally enclosed in said compartment and is adapted to control the temperature and hence the viscosity of the colour within the box. In order to permit of the production of multi-colour transfers the screen or stencil 1 is provided with a number of fonts 6, each font being adapted to enclose a portion of the stencil to be printed in a particular colour. In the embodiment illustrated in Figure 1 three such fonts are provided but it is to be understood that any suitable number may be employed and if desired a different colour may be supplied to each. The stencil box 3 is formed with a port or connection 7 so that air under pressure may be supplied to said box if and when desired, in order to force the colour through the stencil or screen 1. The box 3 is moreover, detachably supported in a forked bracket 8 which is pivotally mounted on a spindle 9 suitably supported in bearings carried by brackets 10 rigidly secured to the machine frame. The bracket 8 is normally held in the position shown in Figure 1 wherein it is in contact with suitable stops 11 carried by the machine frame by means of compression springs 12. The transfer paper to which the colours are to be applied is supported upon a table or the like 13 (Figures 1 and 10) which is also pivoted on the spindle 9 and is adapted to be swung towards and away from the stencil 1. The arrangement is such that the paper is actually supported on a layer 14 which consists of a sheet of sponge rubber or a number of layers of linen or other porous material, said layer 14 being held in position around its edges by means of a clamping frame 15 and supported on a perforated plate or grid 16 which latter is covered with a fine wire mesh gauze 17. The perforated plate or grid 16 is supported above a vacuum recess 18, a conduit or channel 19 being provided adapted to connect said recess with a source of vacuum. Below the recess 18 and separated therefrom is a chamber 20 in which a resistance heating element 21 is disposed, said element being totally enclosed and adapted for heating the table 13 in order to prevent the colour above the screen or stencil 1 from becoming chilled due to repeated contact of the table and the screen. The chamber 20 is sealed by a cover plate 22 which is formed on its underside with a boss 23 to which links 24 are pivotally connected, said links being connected at their opposite ends to a piston rod 25 which is associated with a piston 26 disposed within a cylinder 27, the arrangement being such that upon reciprocation of the piston the table 13 will be moved into and out of contact with the screen 1. The operation of the piston 26 is, in the embodiment illustrated, controlled through the medium of a spool valve 28 which is adapted to control the flow of air to and from the cylinder 27, said valve being actuated through the medium of a treadle 29 which is connected thereto by means of a link 30. The arrangement is such that upon depression of the treadle 29 against the action of a spring 31 the table 13 will be moved into contact with the screen or stencil 1, the spring 31 being adapted on release of pressure on the treadle to return the latter to its initial position and hence to cause movement of the valve 28 and subsequent removal of the table from contact with the screen 1. The piston rod 25 is, as will be seen from Figure 1, adapted to extend through the lower cylinder head 32 and is threaded to receive a disc 33, which latter is formed with a rounded edge as shown and is adapted to operate trip valves 34 and 35. The trip valves 34 and 35 are adapted to control the movement of a piston or spool valve 36 which is in turn adapted to control the connection of the channel 19 and recess 18 in the table 13 with a vacuum line indicated by 37. The channel or conduit 19 is connected to the casing housing the valve 36 by means of a conduit indicated by 38. 39 denotes a line for high pressure air which is adapted to communicate by way of branch lines 40, 41 and 42 with the casing housing the valve 28 and the trip valves 34 and 35 respectively. In operation a piece of transfer paper is placed on the table 13 and the treadle 29 is depressed, thereby causing actuation of the valve 28 and subsequent admission of high pressure air to the lower side of the piston 26, which is thereupon moved upwardly and imparts through the medium of the link 24 a corresponding movement to the table 13. As the table approaches the screen 1, i. e. as the piston rod 25 rises, the trip valve 34 will be operated by the disc 33 and movement of the valve 36 will take place due to the admission of high pressure air into one end thereof. This movement of the valve 36 is adapted to effect connection of the vacuum recess 18 in the table with the vacuum line 37 and the exhausting of said recess will cause the transfer paper to be held firmly in contact with the porous layer 14 and when the paper, which is itself porous, is brought into contact with the stencil 1 colour will be drawn through the mesh of the stencil on to the transfer paper.

It will be understood that if desired it would be feasible to assist the forcing of the colour through the stencil 1 by building up a pressure in the box 3 at the appropriate time, air being supplied to said box through the port or connection 7.

On release of the treadle 29 the spring 31 will urge the same towards its initial position and will thus cause downward movement of the valve 28 and subsequent supply of pressure air to the top of the piston 26. The result of downward movement of the piston will cause the table 13 to be lowered away from the screen, the air at the lower side of said piston being exhausted through the valve 28. The printed transfer will be held on the layer 14 by the vacuum during lowering of the table 13 and said transfer will therefore be stripped from the screen. As the table reaches its lowest position the trip valve 35 will be operated by the disc 33 on the piston rod 25 and this will effect actuation of the valve 36 owing to the fact that pressure air will then be supplied thereto through said valve 35. The movement of the valve 36 results in disconnection of the recess 18 with the vacuum line 37 and allows complete removal of the transfer from the layer 14.

Figure 2:
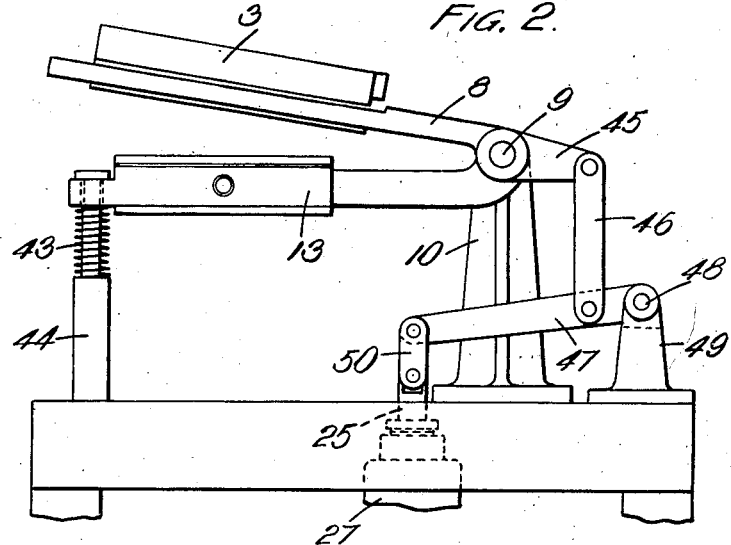
Figure 2 shows an alternative construction to that shown in Figure 1.

In the arrangement shown in Figure 2 the table is held yieldingly by means of springs 43 against stops 44 on the machine frame and the stencil box 3 is raised and lowered in accordance with the movement of the piston 26 within the cylinder 27. In this case an arm 45 is formed on or associated with the bracket 8 and is connected by means of a link 46 with a lever 47, said lever being pivotally mounted at one end on a spindle 48 carried by brackets 49 secured to the machine frame. The lever is connected at its other end by means of a link 50 with the piston rod 25. The operation of the apparatus is controlled by the treadle and is exactly the same as that above described with reference to Figure 1, the only exception being that in this case the box 3 is moved towards and away from the table 13 which is maintained stationary.

Figures 3 and 4 illustrate an arrangement suitable for printing direct on to the surface of bottles or other articles having a curved surface and in these figures 51 denotes an outer casing or the like which is so shaped as to suit the contour of the articles to be printed, said casing being provided with a flexible rim or the like 52 of rubber or other suitable material so that when it is placed in position on the article the rim 52 will make a vacuum tight seal. Mounted within the casing is a stencil box 53 which is adapted to support a stencil 54 in such a manner that the latter is normally held just out of contact with the surface to be printed. The stencil 54 is stretched tightly across the opening formed in the bottom of the box 53, which latter is also so constructed as to suit the shape of the articles to be printed, one or more fonts being arranged above the stencil to contain the colour or colours to be used in printing the design. The casing 51 is provided with a connection 55 communicating with the space around the stencil box, said connection being adapted to communicate with a vacuum valve which on actuation will allow said space to be evacuated. Evacuation of the space will cause the colour to be drawn through the stencil and will also cause the stencil to be moved into contact with the surface of the bottle. 56 denotes a connection communicating with the interior of the stencil box 53, the arrangement being such that if desired the stencil box may be connected to a source of pressure at the same time as air is exhausted from the space below the stencil. Further, means such as heating resistance may be incorporated within the box for maintaining the colour at the most suitable viscosity by controlling its temperature. In addition, a detachable cover 57 is provided adapted to close the box 53 but to allow access to the colour above the stencil. Such a cover is necessary when it is desired to use pressure air, but it may be dispensed with if atmospheric pressure is sufficient to give good results. With the arrangement shown in Figures 3 and 4 the bottles may be continuously brought in succession to the stencil by suitable mechanical means those bottles with the colours applied being moved away in any suitable manner for further treatment. The stencil assembly may for example be mounted for pivotal movement similarly to the box 3 in Figure 2, the supply of air and the application of vacuum being controlled in a similar manner to that described in connection with the construction above referred to.

Figure 5:
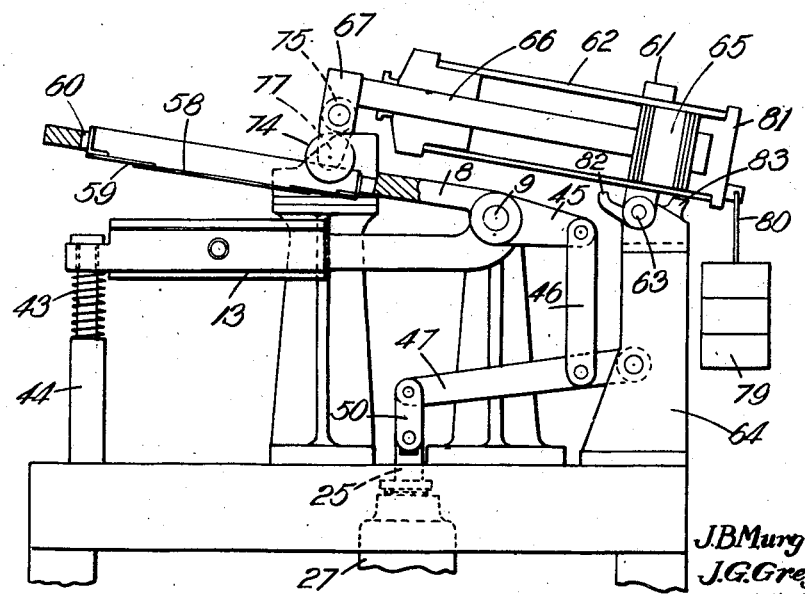
Figure 5 shows partly in section a modified arrangement as compared with that shown in Figure 2 having means for facilitating the stripping of the stencil from the transfer.
Figure 6:
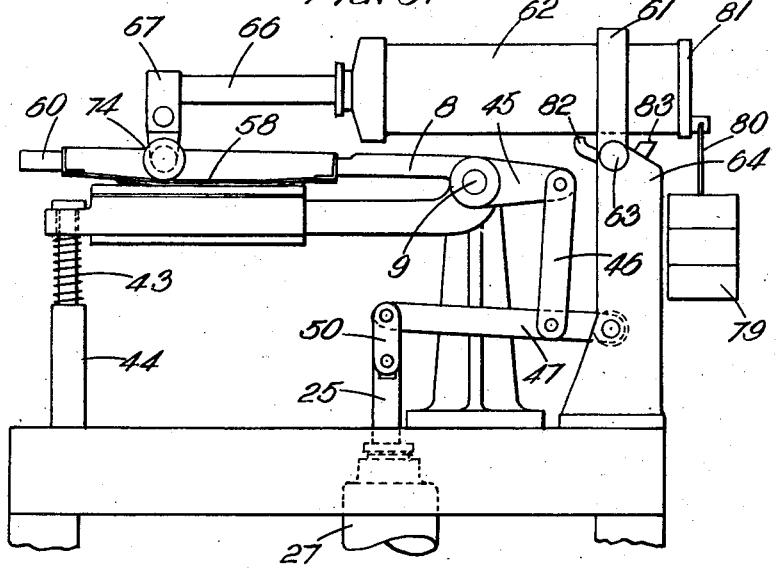
Figure 6 is a similar view to that shown in Figure 5 showing the relative position of the parts at one point in the cycle of operation.
Figure 7:
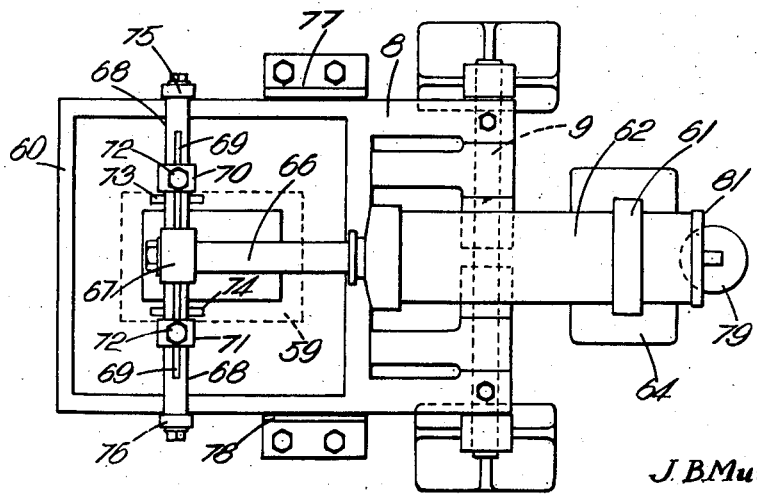
Figure 7 is a plan view of Figure 6.

Referring now to Figures 5, 6, and 7, these show a modified arrangement as compared with that shown in Figure 2 and in this case also the screen or stencil is adapted to be raised or lowered while the transfer support 13 remains stationary. The mechanism for operating the screen or stencil is similar to that above described with reference to Figure 2, the like references denoting the same parts. In these figures, 58 denotes the screen or stencil which is mounted on a rubber or other flexible support 59 in turn secured to the underside of a screen frame 60. Supported in a suitable bracket or the like 61 is a cylinder 62, said bracket 61 being pivotally mounted on a spindle 63 carried in a further bracket 64 so that the cylinder 62 and its associated parts will be allowed movement about the axis of the spindle 63. Disposed within the cylinder 62 is a piston 65, the connecting rod 66 of which is secured to a crosshead 67, which latter is in turn adapted to support a cross shaft 68 having keyways 69 formed therein. Adjustably mounted on the shaft 68 are two brackets 70 and 71 which are adapted to be located and clamped in position by means of set screws 72 engaging in the keyways 69. The brackets 70 and 71 each carry a roller designated 73 and 74 respectively which are adapted to co-operate with the screen in a manner hereinafter more fully described. The shaft 68 is provided at its ends with rollers 75 and 76 adapted to engage cams 77 and 78 which are rigidly supported on the machine frame, the arrangement being such that said cams will cause the rollers 73 and 74 to be lifted clear of the screen at the appropriate time.

In order to provide for adjustment of the load on the rollers 73 and 74 counterbalance weights 79 are mounted on a rod 80 which is pivotally connected to the cylinder end cover 81. Stops 82 and 83 are provided to limit the tilting movement of the cylinder 62.

The mechanism above described normally assumes the positions shown in Figure 5 and on operation a piece of transfer paper is placed on the layer 14 carried by the table 13. The treadle 29 (Figures 1 and 8) is then depressed to actuate the spool valve 28 which causes compressed air to be supplied to the lower end of the cylinder 27 and thus effects lowering of the screen 58 into contact with the transfer paper on the table 13 motion being imparted to said screen through the medium of the piston rod 25 and the appendant linkage mechanism 50, 47, 46, 45 and 9. As the screen approaches the table the trip valve 34 will be actuated and will cause a vacuum to be applied to the recess 18 in the table 13 in the manner above described with reference to Figure 1 while in addition a further spool valve 84, Figure 8, will be actuated to allow compressed air to be supplied to the back of the cylinder 62. As the piston 65 moves forwardly due to the admission of compressed air the rollers 73 and 74 will be moved on to the screen support 59 and into their forward position. The rollers 73 and 74 are so adjusted that they will run on the flexible screen support 59 and for this purpose they are set slightly wider than the maximum width of the design. With the parts in such positions colour is drawn through the screen on to the transfer paper and the treadle 29 is then released. Release of said treadle causes compressed air to be supplied to the top of the cylinder 27 and also to the front of the cylinder 62 and the screen frame 60 commences to lift whilst simultaneously the rollers 73 and 74 are drawn back across the screen support 59. Figure 6 illustrates the position of the parts just after the start of the outward or retractive movement of the piston 65. The screen 58 is held in contact with the transfer due to the action of the rollers 73 and 74 and as said rollers are moved across the screen support 59 from front to back and due to the lifting of the screen frame 60 the screen 58 is stripped from the surface of the transfer, the line of separation between the screen and the transfer at any time throughout this movement being a straight line.

The object of the arrangement above described with reference to Figures 5 to 7 is to overcome the difficulty experienced as a result of the flexibility of the screens at present in use. When the screen is moved away from the printed transfer without the use of rollers such as 73 and 74 said screen is flexed due to the tackiness of the colour with the result that the final separation between the screen and the transfer takes place at a point or area of very small dimensions. At this final point or area of separation the surface of the transfer paper has been pulled off by the colour in the mesh of the screen and such paper eventually blocks up the mesh of the screen and spoils subsequent prints.

Figure 8 shows diagrammatically the arrangement of trip valves and spool valves for controlling the movements of the screen frame and the rollers respectively and also the various pipe connections.

The arrangement is similar to that shown in Figure 1 as regards the control of the vacuum valve 36 and the cylinder 27 but an additional spool valve 84 is arranged to control the supply of compressed air to the cylinder 62 and this is moved over in one direction by means of the trip valve 34 which is connected thereto by means of the pipe line 85. The valve 84 is moved in the reverse direction through the medium of air supplied through the line 86 which latter is connected to the pipe communicating with the top of the cylinder 27. The disc 33, Figure 1, is, in the embodiment illustrated in Figure 8, replaced by a guide block 87 provided with a hinged link 88 the arrangement being such that the trip valve 34 is operated on upward movement of the piston rod 25 only. 89 and 90, Figure 8, denote cushion valves.

What we claim and desire to secure by Letters Patent of the United States is:

1. In a stenciling apparatus, a stencil screen having pervious portions through which colouring material is adapted to be applied to the surface of a porous article, a perforate membrane in coextensive contact with the article for supporting the latter in contact with the screen, means cooperating with the screen, the article and the membrane forming a chamber on each side thereof and between which the screen, the article and the membrane constitute a dividing wall, and means for applying a differential pressure to the chambers to force colouring material placed on the screen through the latter and onto the article.

2. In a stenciling apparatus, a stencil screen having pervious portions through which colouring material is adapted to be applied to the surface of a porous article, a perforate membrane in coextensive contact with the article for supporting the latter in contact with the screen, means cooperating with the screen, the article and the membrane forming a chamber on each side thereof and between which the screen, the article and the membrane in their entirety constitute a dividing wall, means for applying vacuum to the chamber on the side of the article remote from the screen, and means for simultaneously applying pressure to the other chamber.

3. In a stenciling apparatus, a stencil screen having pervious portions through which colouring material is adapted to be applied to the surface of a porous article, a perforate membrane in coextensive contact with the article for supporting the latter in contact with the screen, means cooperating with the screen, the article and the membrane forming a chamber on each side thereof and between which the screen, the article and the membrane in their entirety constitute a dividing wall, and means for applying pressure to the chamber on the side of the article remote from the membrane.

4. In a stenciling apparatus, a stencil screen having pervious portions through which colouring material is adapted to be applied to the surface of a porous article, means for supporting the screen in a horizontal plane, a perforate membrane movable toward and away from the screen for supporting a porous article in coextensive contact with the screen, means for moving the membrane, and means establishing a differential pressure between the side of the screen remote from the article and the side of the article remote from the screen when the article supported by the membrane is in contact with the screen to force colouring material placed on the screen through the pervious portions thereof and onto the article.

5. In a stenciling apparatus, a stencil screen having pervious portions through which colouring material is adapted to be applied to the surface of a porous article, means for supporting the screen in a horizontal plane, a perforate membrane movable toward and away from the screen for supporting a porous article in coextensive contact with the screen, means cooperating with the membrane to form a vacuum chamber of which the membrane constitutes one wall thereof, means for moving the membrane and cooperating means in unison, and means establishing a vacuum connection to the chamber when the article supported by the membrane is in contact with the screen.

6. In a stenciling apparatus, a stencil screen having pervious portions through which colouring material is adapted to be applied to the surface of a porous article, a perforate membrane for supporting a porous article in contact with the screen coextensively, means for moving the screen and membrane relative to each other toward and away from each other to bring the article and screen into and out of contact, and means establishing a differential pressure between the side of the screen remote from the article and the side of the article remote from the screen when the article and screen are in contact with each other to force colouring material placed on the screen through the pervious portions thereof and onto the article.

7. In a stenciling apparatus, a stencil screen frame, a stencil screen having pervious portions extending across the frame, a plurality of fonts on the screen for confining colouring material of different colours placed on the screen to restricted areas thereof, means for supporting a porous article in contact with the screen coextensively, and means for applying a vacuum to the side of the article remote from the screen to draw the colouring material confined in said fonts through the pervious portions of the screen and onto the article.

8. In an apparatus for decorating the surfaces of articles, a stencil screen having pervious portions through which colouring material is adapted to be applied to the surface of a porous article, a perforate membrane in coextensive contact with the article for supporting the latter in coextensive contact with the screen, means cooperating with the screen, the article and the membrane forming a chamber on each side thereof and between which the screen, the article and the membrane in their entirety constitute a dividing wall, means for applying heat to the interior of one of the two chambers, and means applying vacuum to the chamber on the side of the article remote from the screen.

9. In an apparatus for decorating the surfaces of articles, a stencil screen having pervious portions through which colouring material is adapted to be applied to the surface of porous articles, a perforate membrane in coextensive contact with the article for supporting the latter in coextensive contact with the screen, means cooperating with the screen, the article and the membrane forming a chamber on each side thereof and between which the screen, the article and the membrane in their entirety constitute a dividing wall, plural means for applying heat to both chambers, and means for applying vacuum to the chamber on the side of the membrane remote from the screen.

JOHN BLACKBURN MURGATROYD.
JOHN GOODLAND GREGORY.